US012739931B2

(12) United States Patent
Wu et al.

(10) Patent No.: US 12,739,931 B2
(45) Date of Patent: Sep. 15, 2026

(54) METHOD AND APPARATUS FOR PATH SWITCH IN A WIRELESS COMMUNICATION SYSTEM

(71) Applicant: Lenovo (Beijing) Limited, Beijing (CN)

(72) Inventors: Lianhai Wu, Beijing (CN); Jing Han, Beijing (CN); Jie Hu, Beijing (CN); Min Xu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 289 days.

(21) Appl. No.: 18/267,244

(22) PCT Filed: Dec. 15, 2020

(86) PCT No.: PCT/CN2020/136419
§ 371 (c)(1),
(2) Date: Jun. 14, 2023

(87) PCT Pub. No.: WO2022/126360
PCT Pub. Date: Jun. 23, 2022

(65) Prior Publication Data

US 2024/0057203 A1 Feb. 15, 2024

(51) Int. Cl.
*H04W 76/27* (2018.01)
*H04W 36/00* (2009.01)
(Continued)

(52) U.S. Cl.
CPC ......... *H04W 76/27* (2018.02); *H04W 36/037* (2023.05); *H04W 36/08* (2013.01); *H04W 36/023* (2013.01); *H04W 88/04* (2013.01)

(58) Field of Classification Search
CPC . H04W 36/023; H04W 36/037; H04W 36/08; H04W 76/27; H04W 88/04
See application file for complete search history.

(56) References Cited

U.S. PATENT DOCUMENTS

2020/0322847 A1 10/2020 Byun et al.
2023/0030653 A1* 2/2023 Hori ...................... H04W 12/04
(Continued)

FOREIGN PATENT DOCUMENTS

CN 109479220 A 3/2019
CN 110720238 A 1/2020
(Continued)

OTHER PUBLICATIONS 20965378.1 , "European Search Report", Application No. 20965378.1, Jun. 26, 2024, 10 pages.
(Continued)

*Primary Examiner* — Brian P Cox
(74) *Attorney, Agent, or Firm* — FIG. 1 Patents

(57) ABSTRACT

Embodiments of the present disclosure relate to methods and apparatuses for path switch in a wireless communication system. According to some embodiments of the disclosure, a method may include: establishing, at a first user equipment (UE), a radio resource control (RRC) connection with abase station (BS) via a second UE, wherein a PC5 RRC connection between the first UE and the second UE has been established and an RRC connection between the second UE and the BS has been established; receiving an RRC reconfiguration message including a path switching indication from the BS, wherein the path switching indication indicates a switch to a target cell of the BS using a Uu interface; in response to the path switch indication, performing a random access (RA) with the BS; and in response to accessing a target cell, transmitting an RRC reconfiguration complete message to the BS. Furthermore, the second UE may receive an indication from the BS to release the first UE. The second UE may forward the buffered data from the first UE to the BS after receiving the release indication.

20 Claims, 7 Drawing Sheets

(51) Int. Cl.

| | |
|---|---|
| ***H04W 36/02*** | (2009.01) |
| ***H04W 36/08*** | (2009.01) |
| ***H04W 88/04*** | (2009.01) |

(56) References Cited

U.S. PATENT DOCUMENTS

| | | | | |
|---|---|---|---|---|
| 2023/0074899 | A1* | 3/2023 | Wang | H04W 40/12 |
| 2023/0180076 | A1* | 6/2023 | Paladugu | H04W 36/0058<br>370/331 |
| 2023/0247513 | A1* | 8/2023 | Paladugu | H04W 88/04<br>370/315 |

FOREIGN PATENT DOCUMENTS

| | | | | |
|---|---|---|---|---|
| CN | 111901836 A | 11/2020 | | |
| EP | 3637940 A1 | 4/2020 | | |
| WO | WO-2018028694 A1 * | 2/2018 | | H04W 40/22 |

OTHER PUBLICATIONS

Nokia , "Remaining issues on RRC for NR V2X", 3GPP TSG-RAN WG2 Meeting #110-e, R2-2004596, Elbonia [retrieved Jul. 31, 2023]. Retrieved from the Internet <https://www.3gpp.org/ftp/TSG_RAN/WG2_RL2/TSGR2_110-e/Docs/>., Jun. 2020, 5 Pages.

PCT/CN2020/136419 , "International Preliminary Report on Patentability", PCT Application No. PCT/CN2020/136419, Jun. 29, 2023, 5 pages.

PCT/CN2020/136419 , "International Search Report and Written Opinion", PCT Application No. PCT/CN2020/136419, Aug. 27, 2021, 6 pages.

Foreign Office Action issued in Cn 202080107900.X, mailed Apr. 25, 2026, 20 pages.

Intel Corporation, "Characteristics of L2 and L3-based Sidelink Relaying", 3GPP TSG-RAN WG2 Meeting #111, R2-2006718, Aug. 17, 2020, 23 pages.

* cited by examiner

METHOD AND APPARATUS FOR PATH SWITCH IN A WIRELESS COMMUNICATION SYSTEM

TECHNICAL FIELD

Embodiments of the present disclosure generally relate to wireless communication technology, especially to path switch in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In the above wireless communication systems, a user equipment (UE) may communicate with another UE via a data path supported by an operator's network, e.g., a cellular or a Wi-Fi network infrastructure. The data path supported by the operator's network may include a base station (BS) and multiple gateways.

Some wireless communication systems may support sidelink communications, in which devices (e.g., UEs) that are relatively close to each other may communicate with one another directly via a SL, rather than being linked through the BS. A relaying function based on a sidelink may be supported in a communication network. For example, a UE supporting sidelink communication may function as a relay node to extend the coverage of a BS. An out-of-coverage UE may communicate with a BS via a relay UE. In the context of the present disclosure, a UE, which functions as a relay between another UE and a BS, may be referred to a UE-to-network relay or a U2N relay.

There is a need for efficiently performing communication in a communication system supporting a U2N relay.

SUMMARY

According to some embodiments of the present disclosure, a method may include: establishing, at a first user equipment (UE), a radio resource control (RRC) connection with a base station (BS) via a second UE, wherein a PC5 RRC connection between the first UE and the second UE has been established and an RRC connection between the second UE and the BS has been established; receiving an RRC reconfiguration message including a path switching indication from the BS, wherein the path switching indication indicates a switch to a target cell of the BS using a Uu interface; in response to the path switch indication, performing a random access (RA) with the BS; and in response to accessing a target cell, transmitting an RRC reconfiguration complete message to the BS.

According to some embodiments of the present disclosure, a method may include: establishing a radio resource control (RRC) connection between a second user equipment (UE) and a base station (BS); establishing a PC5 RRC connection between a first UE and the second UE; and receiving, at the second UE from the BS, an RRC reconfiguration message that indicates a release of the first UE.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present disclosure provide technical solutions for supporting the relaying function based on a sidelink, and can facilitate and improve the implementation of various communication technologies such as 5G NR. For example, embodiments of the present disclosure provide technical solutions for path switch of a remote UE from a relay UE to a cell using a Uu interface.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
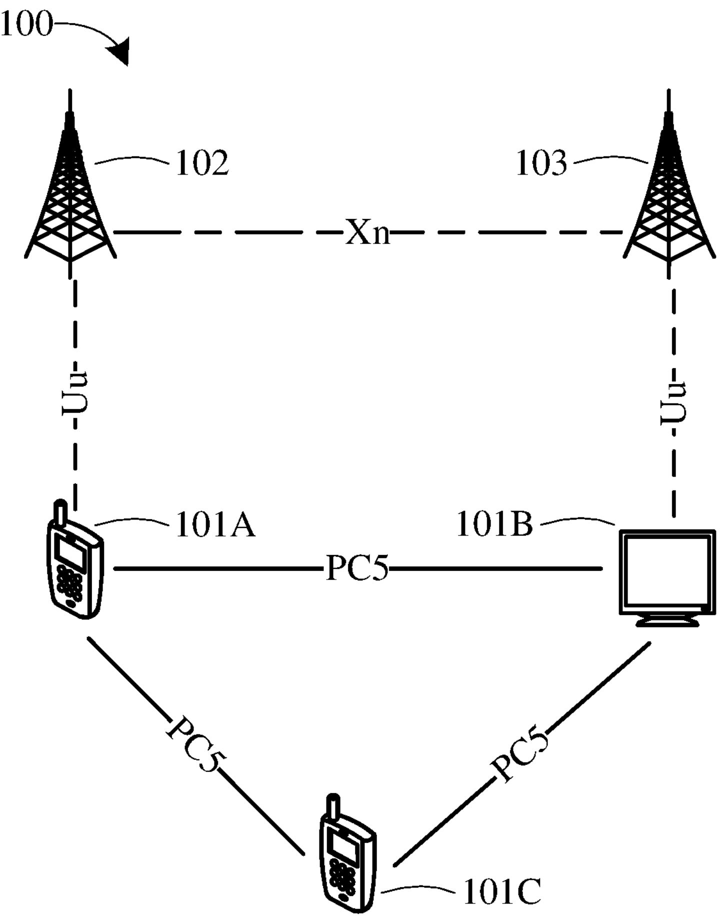
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, the wireless communication system 100 may support sidelink communications. Sidelink communication supports an UE-to-UE direct communication. In the context of the present disclosure, sidelink communications may be categorized according to the wireless communication technologies adopted. For example, sidelink communication may include NR sidelink communication and V2X Sidelink communication.

NR sidelink communications (e.g., specified in 3GPP specification TS 38.311) may refer to access stratum (AS) functionality enabling at least vehicle-to-everything (V2X) communications as defined in 3GPP specification TS 23.287 between neighboring UEs, using NR technology but not traversing any network node. V2X sidelink communications (e.g., specified in 3GPP specification TS 36.311) may refer to AS functionality enabling V2X communications as defined in 3GPP specification TS 23.285 between neighboring UEs, using evolved-universal mobile telecommunication system (UMTS) terrestrial radio access (UTRA) (E-UTRA) technology, but not traversing any network node. However, if being not specified, “sidelink communications” may refer to NR sidelink communications, V2X sidelink communications, or any sidelink communications adopting other wireless communication technologies.

Referring to FIG. 1, the wireless communication system 100 may include some base stations (e.g., BS 102 and BS 103) and some UEs (e.g., UE 101A, UE 101B, and UE 101C). Although a specific number of UEs and BSs is depicted in FIG. 1, it is contemplated that any number of UEs and BSs may be included in the wireless communication system 100.

The UEs and the BSs may support communication based on, for example, 3G, long-term evolution (LTE), LTE-advanced (LTE-A), new radio (NR), or other suitable protocol(s). In some embodiments of the present disclosure, a BS (e.g., BS 102 or BS 103) may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. A UE (e.g., UE 101A, UE 101B, or UE 101C) may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

In the example of FIG. 1, the BS 102 and the BS 103 may be included in a next generation radio access network (NG-RAN). In some embodiments of the present disclosure, the BS 102 may be a gNB and the BS 103 may be an ng-eNB.

The UE 101A and UE 101B may be in-coverage (e.g., inside the NG-RAN). For example, as shown in FIG. 1, the UE 101A may be within the coverage of BS 102, and the UE 101B may be within the coverage of BS 103. The UE 101C may be out-of-coverage (e.g., outside the coverage of the NG-RAN). For example, as shown in FIG. 1, the UE 101C may be outside the coverage of any BSs, for example, both the BS 102 and BS 103. The UE 101A and UE 101B may respectively connect to the BS 102 and BS 103 via a network interface, for example, the Uu interface as specified in 3GPP standard documents. The control plane protocol stack in the Uu interface may include a radio resource control (RRC) layer, which may be referred to as a Uu RRC. The BS 102 and BS 103 may be connected to each other via a network interface, for example, the Xn interface as specified in 3GPP standard documents. The UE 101A, UE 101B, and UE 101C may be connected to each other respectively via, for example, a PC5 interface as specified in 3GPP standard documents. The control plane protocol stack in the PC5 interface may include a radio resource control (RRC) layer, which may be referred to as a PC5 RRC.

Support for V2X services via the PC5 interface can be provided by, for example, NR sidelink communication and/or V2X sidelink communication. NR sidelink communication can support one of the following three types of transmission modes for a pair of a source Layer-2 identity and a destination Layer-2 identity: unicast transmission, groupcast transmission, and broadcast transmission. Sidelink communication transmission and reception over the PC5 interface are supported when the UE is either in-coverage or out-of-coverage. For example, the UE 101A, which is within the coverage of the BS 102, can perform sidelink transmission and reception (e.g., sidelink unicast transmission, sidelink groupcast transmission, or sidelink broadcast transmission) over a PC5 interface. The UE 101C, which is outside the coverage of both the BS 102 and BS 103, can also perform sidelink transmission and reception over a PC5 interface.

A UE which supports sidelink communication and/or V2X communication may be referred to as a V2X UE. A V2X UE may be a cell phone, a vehicle, a roadmap device, a computer, a laptop, an IoT (internet of things) device or other type of device in accordance with some other embodiments of the present disclosure.

As mentioned above, the relaying function based on a sidelink may be supported in a communication network. In some embodiments of the present disclosure, a UE-to-network relay is supported. For example, an in-coverage UE in communication with an out-of-coverage UE may function as a relay UE between the serving BS of the in-coverage UE and the out-of-coverage UE. In some embodiments of the present disclosure, a UE-to-UE relay is supported. For example, a UE in communication with two or more UEs (e.g., first and third UEs) may function as a relay UE, such that the first UE may communicate with the third UE via the relay UE.

Figure 2:
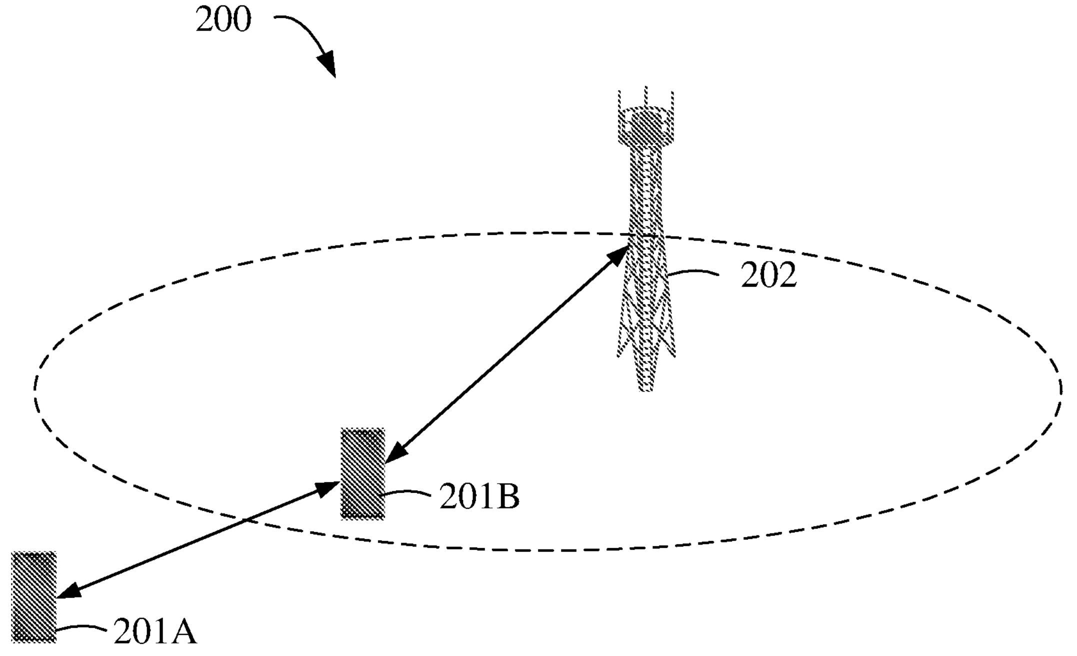
FIG. 2 illustrates a schematic diagram of a wireless communication system in accordance with some embodiments of the present disclosure.

FIG. 2 illustrates a schematic diagram of a wireless communication system 200 in accordance with some embodiments of the present disclosure.

As shown in FIG. 2, the wireless communication system 200 may include a BS (e.g., BS 202) and some UEs (e.g., UE 201A and UE 201B). Although a specific number of UEs and BS is depicted in FIG. 2, it is contemplated that any number of UEs may be included in the wireless communication system 200.

Referring to FIG. 2, UE 201B may be within the coverage of BS 202. UE 201B and BS 202 may establish an RRC connection therebetween. UE 201A may be outside of the coverage of BS 202. In some examples, UE 201B may function as UE 101A or UE 101B shown in FIG. 1, and UE 201A may function as UE 101C shown in FIG. 1.

The wireless communication system 200 may support sidelink communications. For example, UE 201B may be in sidelink communication with UE 201A. A PC5 RRC connection may be established between UE 201A and UE 201B. In some embodiments of the present disclosure, UE 201A may initiate a procedure for establishing connection with BS 202 via UE 201B (i.e., UE-to-network relay). For example, UE 201A may transmit an RRC setup request to BS 202 via UE 201B. BS 202 may transmit an RRC setup message including a response to UE 201A via UE 201B. After such procedure, UE 201A may access BS 202 via UE 201B. UE 201A and BS 202 may establish an RRC connection therebetween, and UE 201A may have RRC states, such as an RRC_IDLE state, an RRC_INACTIVE state, and an RRC_CONNECTED state. UE 201A may also be referred to as a remote UE and UE 201B may also be referred to as a relay UE.

It should be appreciated by persons skilled in the art that although a single relay node between UE 201A and BS 202 is depicted in FIG. 2, it is contemplated that any number of relay nodes may be included.

Under certain circumstances, for example, when UE 201A moves from out-of-coverage to in-coverage, BS 202 may determine to switch UE 201A from the relay link to the Uu link. Embodiments of the present disclosure provide solutions for performing such path switch procedure.

Figure 3:
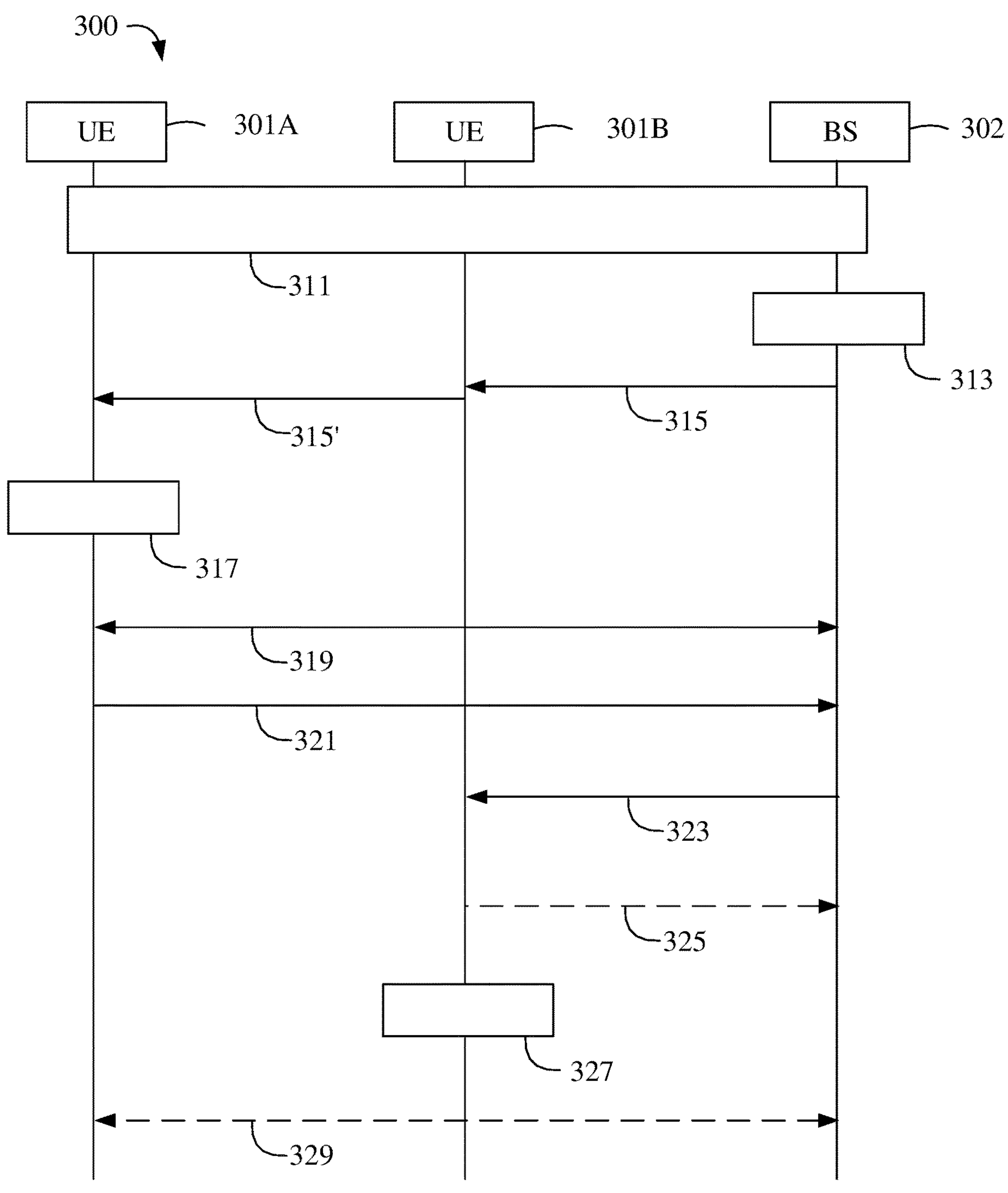
FIG. 3 illustrates an exemplary path switch procedure in accordance with some embodiments of the present disclosure.

FIG. 3 illustrates an exemplary path switch procedure 300 in accordance with some embodiments of the present disclosure. Details described in all of the foregoing embodiments of the present disclosure are applicable for the embodiments shown in FIG. 3.

Referring to FIG. 3, in operation 311, UE 301A is in sidelink communication with UE 301B, and UE 301B is accessing BS 302. In other words, a PC5 RRC connection has been established between UE 301A and UE 301B, and an RRC connection has been established between UE 301B and BS 302. UE 301B may function as a relay such that an RRC connection can be established between UE 301A and BS 302. UE 301A may be configured with a measurement configuration by BS 302, and may report corresponding measurement results to BS 302.

In operation 313, based on the measurement results, BS 302 may determine to switch UE 301A to a cell (hereinafter also referred to as "target cell") of BS 302 using the Uu interface. The target cell can be the same cell as the current serving cell of UE 301A or a difference cell.

In operation 315 and operation 315', BS 302 may transmit an RRC reconfiguration message to UE 301A via UE 301B. The RRC reconfiguration message may include a path switching indication, which may indicate a switch of UE 301A to a cell of BS 302 using the Uu interface. In some embodiments of the present disclosure, the path switch indication may be indicated by a reconfiguration with sync information element (IE) in the RRC reconfiguration message.

In operation 317, in response to the RRC reconfiguration message or the path switch indication, UE 301A may retain or keep at least one of a service data adaptation protocol (SDAP) configuration, a packet data convergence protocol (PDCP) configuration, and an RRC configuration. In some examples, one or more of the above configurations may be reused later.

In some embodiments of the present disclosure, in response to the RRC reconfiguration message or the path switch indication, UE 301A may suspend the uplink (UL) transmission to BS 302 (e.g., UL data terminated at the BS). In some embodiments of the present disclosure, UE 301A may start a handover timer (e.g., T304 as specified in 3GPP specifications) in response to the RRC reconfiguration message or the path switch indication. In some examples, the value of the handover timer may be configured in the RRC reconfiguration message (e.g., in the reconfiguration with sync IE).

In some embodiments of the present disclosure, in response to the RRC reconfiguration message or the path switch indication, UE 301A may transmit a PC5 link release indication to UE 301B (not shown in FIG. 1). In this way, UE 301A may initiate the release of the PC5 RRC connection between UE 301A and UE 301B. For example, the UE 301B may release the PC5 RRC connection between UE 301A and UE 301B (including the corresponding PC5 configuration) in response to the PC5 link release indication. In some embodiments of the present disclosure, in response to the RRC reconfiguration message or the path switch indication, UE 301A may release the PC5 RRC connection between UE 301A and UE 301B. UE 301A may or may not release the RRC connection between UE 301A and BS 302.

In some embodiments of the present disclosure, in response to the RRC reconfiguration message or the path switch indication, UE 301A may perform a random access (RA) with BS 302 in operation 319. For example, UE 301A and BS 302 may perform an RA procedure (RAP) according to one of the known RAPs in the art.

In operation 321, in response to a successful RA or accessing a target cell, UE 301A may transmit an RRC reconfiguration complete message to BS 302. The RRC reconfiguration complete message may be transmitted via the Uu interface, based on, for example, configurations provided in the RRC reconfiguration message.

In some embodiments of the present disclosure, in operation 329 (denoted by dotted line as an option), UE 301A may transmit a UL transmission (e.g., UL data, UL signaling, or both) to BS 302 via the Uu interface, and BS 302 may transmit a DL transmission (e.g., DL data, DL signaling, or both) to UE 301A via the Uu interface.

In operation 323, BS 302 may transmit an RRC reconfiguration message (another RRC reconfiguration message) to UE 301B. The another RRC reconfiguration message may indicate a release of a remote UE (e.g., UE 301A) which accesses BS 302 via UE 301B, the corresponding configuration associated with UE 301A (e.g., bearer mapping configuration), or both.

In some embodiments of the present disclosure, the another RRC reconfiguration message may indicate a local UE ID of the remote UE (e.g., UE 301A) to be released. For example, the another RRC reconfiguration message may include a release list, which may indicate the local UE ID of UE 301A. A relay UE (e.g., UE 301B) may allocate respective local UE ID(s) to remote UE(s) (e.g., UE 301A) connected to the relay UE.

In some embodiments of the present disclosure, the another RRC reconfiguration message may indicate whether a UL transmission (e.g., UL data, UL signaling, or both) from the remote UE (e.g., UE 301A) to BS 302 buffered at UE 301B (e.g., stored in a buffer or memory of UE 301B) is transmitted to BS 302 or not (hereinafter, UL transmission indication).

In some embodiments of the present disclosure, in response to the another RRC reconfiguration message, UE 301B may not transmit or continue to transmit the DL data, DL signaling or both (originated from either UE 301B or BS 302) to UE 301A.

In some embodiments of the present disclosure, in response to the another RRC reconfiguration message, UE 301B may release the PC5 RRC connection (e.g., including the corresponding PC5 configuration associated with UE 301A) between UE 301A and UE 301B. In some embodiments of the present disclosure, in response to the another RRC reconfiguration message, UE 301B may transmit a PC5 link release indication to UE 301A (not shown in FIG. 3). In this way, UE 301B may initiate the release of the PC5 RRC connection between UE 301A and UE 301B. The UE 301A may release the PC5 RRC connection between UE 301A and UE 301B (including the corresponding PC5 configuration) in response to the PC5 link release indication. In some embodiments of the present disclosure, in response to the another RRC reconfiguration message, UE 301B may clear the DL buffer associated with UE 301A.

In operation 325 (denoted by dotted line as an option), when there is a UL transmission from UE 301A to BS 302 buffered at UE 301B, UE 301B may transmit or continue to transmit the UL transmission (e.g., UL data, UL signaling, or both) to the BS after the reception of the another RRC reconfiguration message. In some embodiments of the present disclosure, UE 301B may determine whether to transmit the UL transmission based on the UL transmission indication in the another RRC reconfiguration message.

UE 301B may inform BS 302 of the completion of the UL transmission from UE 301A. In some embodiments of the present disclosure, UE 301B may transmit an end-mark indication indicating a last UL transmission associated with UE 301A. For example, UE 301B may include such indication in the header of a data unit of the last UL data to indicate the completion of the UL data transmission. In some embodiments of the present disclosure, UE 301B may transmit one of an RRC message, a control protocol data unit (PDU) on an adaptation layer and a medium access control (MAC) control element (CE) to indicate the completion of the UL transmission forwarding.

In operation 327, in response to the completion of the UL transmission forwarding, UE 301B may release a Uu configuration associated with UE 301A. In the case that no UL transmission forwarding is needed, UE 301B may release the Uu configuration associated with UE 301A in response to the another RRC reconfiguration message.

It should be appreciated by persons skilled in the art that the sequence of the operations in exemplary procedure 300 may be changed and some of the operations in exemplary procedure 300 may be eliminated or modified, without departing from the spirit and scope of the disclosure. For example, although in FIG. 3, operation 323 is shown after operation 321, it should be appreciated by persons skilled in the art that operation 323 can occur before, after, or at the same time as operation 315.

Figure 4:
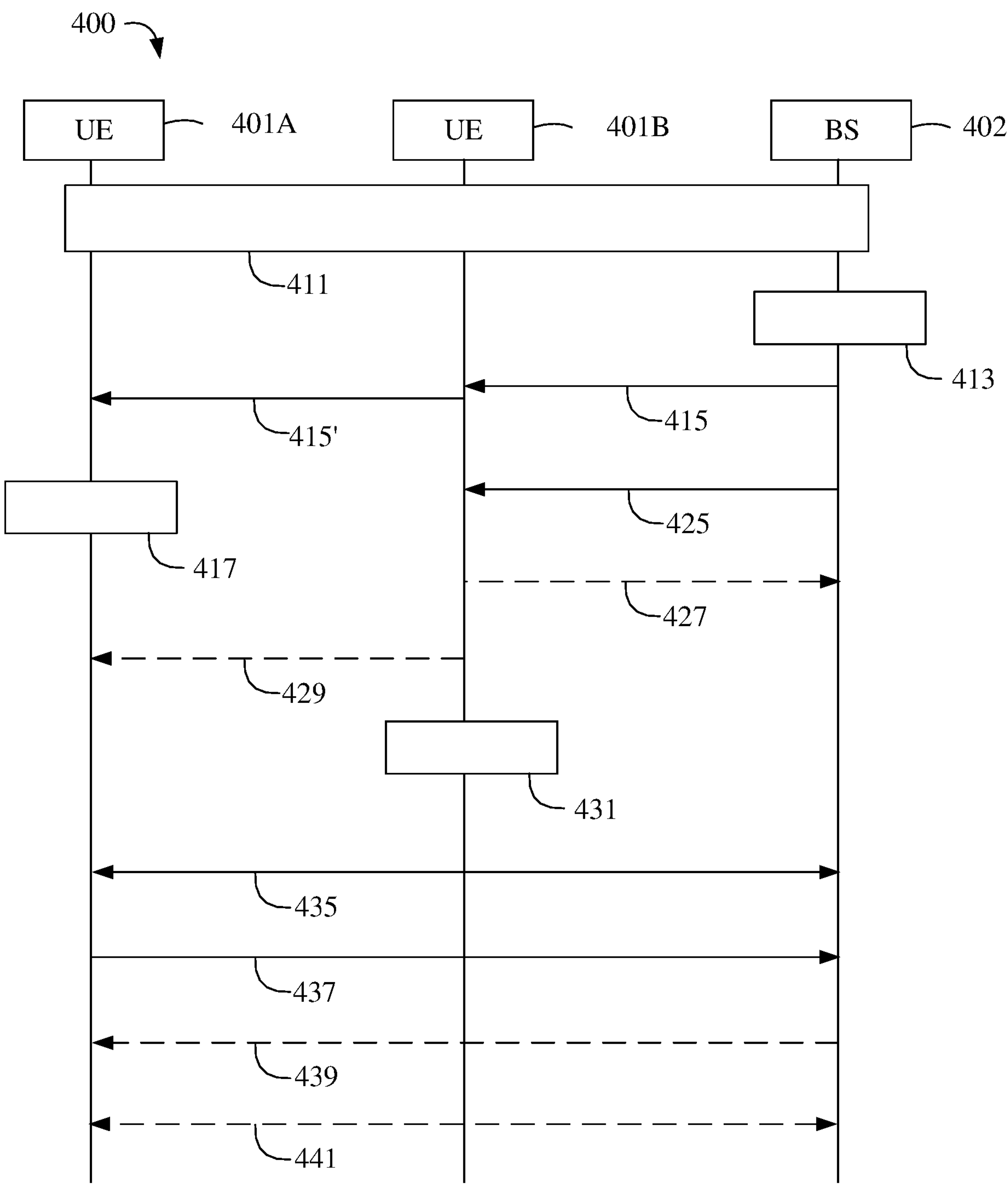
FIG. 4 illustrates an exemplary path switch procedure in accordance with some embodiments of the present disclosure.

FIG. 4 illustrates an exemplary path switch procedure 400 in accordance with some embodiments of the present disclosure. Details described in all of the foregoing embodiments of the present disclosure are applicable for the embodiments shown in FIG. 4.

Referring to FIG. 4, in operation 411, UE 401A is in sidelink communication with UE 401B, and UE 401B is accessing BS 402. In other words, a PC5 RRC connection has been established between UE 401A and UE 401B, and an RRC connection has been established between UE 401B and BS 402. UE 401B may function as a relay such that an RRC connection can be established between UE 401A and BS 402. UE 401A may be configured with a measurement configuration by BS 402, and may report corresponding measurement results to BS 402.

In operation 413, based on the measurement results, BS 402 may determine to switch UE 401A to a cell (hereinafter also referred to as "target cell") of BS 402 using the Uu interface. The target cell can be the same cell as the current serving cell of UE 401A or a difference cell.

In operation 415 and operation 415', BS 402 may transmit an RRC reconfiguration message to UE 401A via UE 401B. The RRC reconfiguration message may include a path switching indication, which may indicate a switch of UE 401A to a cell of BS 402 using the Uu interface. In some embodiments of the present disclosure, the path switch indication may be indicated by a reconfiguration with sync IE in the RRC reconfiguration message.

In operation 417, in response to the RRC reconfiguration message or the path switch indication, UE 401A may retain or keep at least one of an SDAP configuration, a PDCP configuration, and an RRC configuration. In some examples, one or more of the above configurations may be reused later.

In some embodiments of the present disclosure, in response to the RRC reconfiguration message or the path switch indication, UE 401A may suspend the UL transmission to BS 402 (e.g., UL data, UL signaling or both terminated at BS 402). In some embodiments of the present disclosure, UE 401A may start a handover timer (e.g., T404 as specified in 3GPP specifications) in response to the RRC reconfiguration message or the path switch indication. In some examples, the value of the handover timer may be configured in the RRC reconfiguration message (e.g., in the reconfiguration with sync IE).

In some embodiments of the present disclosure, in response to the RRC reconfiguration message or the path switch indication, UE 401A may maintain the PC5 connection between UE 401A and UE 401B. UE 401A may continue a DL transmission or transmit a UL transmission after the reception of the RRC reconfiguration message or the path switch indication.

In some examples, after the reception of the RRC reconfiguration message or the path switch indication, UE 401A may transmit or continue to transmit data, signaling, or both terminated at UE 401B to UE 401B.

In some examples, after the reception of the RRC reconfiguration message or the path switch indication, UE 401A may receive or continue to receive data, signaling, or both originated from either BS 402 or UE 401B from UE 401B. For example, the data, signaling, or both originated from BS 402 to UE 401A may be buffered at the UE 401B. In some embodiments of the present disclosure, UE 401B may inform UE 401A of the completion of the DL transmission (e.g., DL data, DL signaling, or DL both) to UE 401A.

In some embodiments of the present disclosure, UE 401B may transmit, to UE 401A, an end-mark indication indicating a last DL transmission associated with UE 401A. For example, UE 401B may include such indication in the header of a data unit of the last DL data to indicate the completion of DL data forwarding. In some embodiments of the present disclosure, UE 401B may transmit one of an RRC message, a control PDU on an adaptation layer and an MAC CE to indicate the completion of DL transmission forwarding. In some embodiments of the present disclosure, UE 401B may transmit a PC5 link release indication to UE 401A in response to the completion of the DL transmission forwarding. In this way, UE 401B may initiate the release of the PC5 RRC connection between UE 401A and UE 401B.

In some embodiments of the present disclosure, UE 401A may release the PC5 RRC connection between UE 401A and UE 401B in response to the end-mark indication, in response to the completion of DL transmission forwarding indicated by the RRC message, the control PDU on the adaptation layer or the MAC CE, or in response to the PC5 link release indication.

However, in some embodiments of the present disclosure, a fallback mechanism may be applied. In these embodiments, a remote UE (e.g., UE 401A) or a BS, instead of the relay UE (e.g., UE 401B), may initiate the release of the PC5 RRC connection between the remote UE and the relay UE. The PC5 link between the remote UE and the relay UE may be maintained after the completion of DL transmission forwarding. In the case that the remote UE (e.g., UE 401A) fails to establish a Uu link with the BS (BS 402), the remote UE may fall back to the PC5 link.

In operation 425, BS 402 may transmit an RRC reconfiguration message (another RRC reconfiguration message) to UE 401B. The another RRC reconfiguration message may indicate a release of a remote UE (e.g., UE 401A) which accesses BS 402 via UE 401B, the corresponding configuration associated with UE 401A (e.g., bearer mapping configuration), or both. Although in FIG. 4, operation 425 is shown after operation 415, it should be appreciated by persons skilled in the art that operation 425 can occur before, after, or at the same time as operation 415.

In some embodiments of the present disclosure, the another RRC reconfiguration message may indicate a local UE ID of the remote UE (e.g., UE 401A) to be released. For example, the another RRC reconfiguration message may include a release list, which may indicate the local UE ID of UE 401A. A relay UE (e.g., UE 401B) may allocate respective local UE ID(s) to remote UE(s) (e.g., UE 401A) connected to the relay UE.

In some embodiments of the present disclosure, the another RRC reconfiguration message may indicate whether the UL transmission (e.g., UL data, UL signaling, or both) from the remote UE (e.g., UE 401A) to BS 402 buffered at UE 401B (e.g., stored in a buffer or memory of UE 401B) is transmitted to BS 402 or not (hereinafter, UL transmission indication). In some embodiments of the present disclosure, the another RRC reconfiguration message may indicate whether the DL transmission (e.g., DL data, DL signaling, or both) to the remote UE (e.g., UE 401A) from BS 402 buffered at UE 401B (e.g., stored in a buffer or memory of UE 401B) is transmitted to the remote UE or not (hereinafter, DL transmission indication).

In operation 427 (denoted by dotted line as an option), when there is a UL transmission (e.g., UL data, UL signaling, or both) from UE 401A to BS 402 buffered at UE 401B, UE 401B may transmit or continue to transmit the UL transmission to BS 402 after the reception of the another RRC reconfiguration message. In some embodiments of the present disclosure, UE 401B may determine whether to transmit the UL transmission based on the UL transmission indication in the another RRC reconfiguration message.

UE 401B may inform BS 402 of the completion of the UL transmission from UE 401A. In some embodiments of the present disclosure, UE 401B may transmit an end-mark indication indicating a last UL transmission associated with UE 401A. For example, UE 401B may include such indication in the header of a data unit of the last UL data to indicate the completion of the UL data transmission. In some embodiments of the present disclosure, UE 401B may transmit one of an RRC message, a control PDU on an adaptation layer and an MAC CE to indicate the completion of UL transmission forwarding.

In operation 429 (denoted by dotted line as an option), when there is a DL transmission (e.g., DL data, DL signaling, or both) from BS 402 to UE 401A buffered at UE 401B, UE 401B may transmit or continue to transmit the DL transmission to UE 401A after the reception of the another RRC reconfiguration message. UE 401B may also transmit a DL transmission originated from UE 401B to UE 401A. In some embodiments of the present disclosure, UE 401B may determine whether to transmit the DL transmission based on the DL transmission indication in the another RRC reconfiguration message.

UE 401B may inform UE 401A of the completion of the DL transmission to UE 401A, according to one of the methods or other similar method as described above. In some examples, UE 401B may transmit an end-mark indication indicating a last DL data associated with UE 401A. Such indication may be included in the header of a data unit of the last DL data to indicate the completion of DL data forwarding. In some examples, UE 401B may transmit one of an RRC message, a control PDU on an adaptation layer and an MAC CE to indicate the completion of DL data forwarding.

In some embodiments of the present disclosure, UE 401B may transmit a PC5 link release indication to UE 401A in response to the completion of DL transmission forwarding. In some other embodiments of the present disclosure, as stated above, in the case that a fallback mechanism is applied, the release of the PC5 RRC connection may not be initiated by UE 401B.

In operation 431, in response to the completion of the DL transmission forwarding, UE 401B may release the PC5 RRC connection between UE 401A and UE 401B (including the corresponding PC5 configuration). However, in the case that a fallback mechanism is applied, UE 401B may not release the PC5 RRC connection between UE 401A and UE 401B in response to the completion of the DL transmission forwarding, but may do so in response to receiving a PC5 link release indication from UE 401A.

In response to the completion of the UL transmission forwarding, UE 401B may release a Uu configuration associated with UE 401A. In the case that no UL transmission forwarding is needed, UE 401B may release the Uu configuration associated with UE 401A in response to the another RRC reconfiguration message.

In some embodiments of the present disclosure, in response to the RRC reconfiguration message or the path switch indication received in operation 415', UE 401A may perform an RA with BS 402 in operation 435. For example, UE 401A and BS 402 may perform an RAP according to one of the known RAPs in the art.

In operation 437, in response to a successful RA or accessing a target cell, UE 401A may transmit an RRC reconfiguration complete message to BS 402. The RRC reconfiguration complete message may be transmitted via the Uu interface, based on, for example, configurations provided in the RRC reconfiguration message.

In some embodiments of the present disclosure, the RRC reconfiguration complete message may indicate whether the PC5 RRC connection between UE 401A and UE 401B is released or not. In this way, the BS would know whether UE 401A has released the PC5 link. In some embodiments of the present disclosure, the RRC reconfiguration complete message may include a radio link failure (RLF) indication for a PC5 link in response to an RLF on the PC5 RRC connection between UE 401A and UE 401B is detected. In this way, the BS would know whether the path switch indication is timely or somewhat late. In some embodiments of the present disclosure, the RRC reconfiguration complete message may indicate whether the DL transmission (e.g., data, signaling or both) forwarding is completed or not. The BS can determine when to release the PC5 RRC connection between UE 401A and UE 401B.

In some embodiments of the present disclosure, in operation 439 (denoted by dotted line as an option), BS 402 may transmit a PC5 link release indication to UE 401A via the Uu interface in response to the RRC reconfiguration complete message. The PC5 link release indication may be included in an RRC reconfiguration message. UE 401A may release the PC5 RRC connection between UE 401A and UE 401B in response to receiving the PC5 link release indication.

In some embodiments of the present disclosure, in operation 441 (denoted by dotted line as an option), UE 401A may transmit a UL transmission (e.g., UL data, UL signaling, or both) to BS 402 via the Uu interface, and BS 402 may transmit a DL transmission (e.g., DL data, DL signaling, or both) to UE 401A via the Uu interface.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
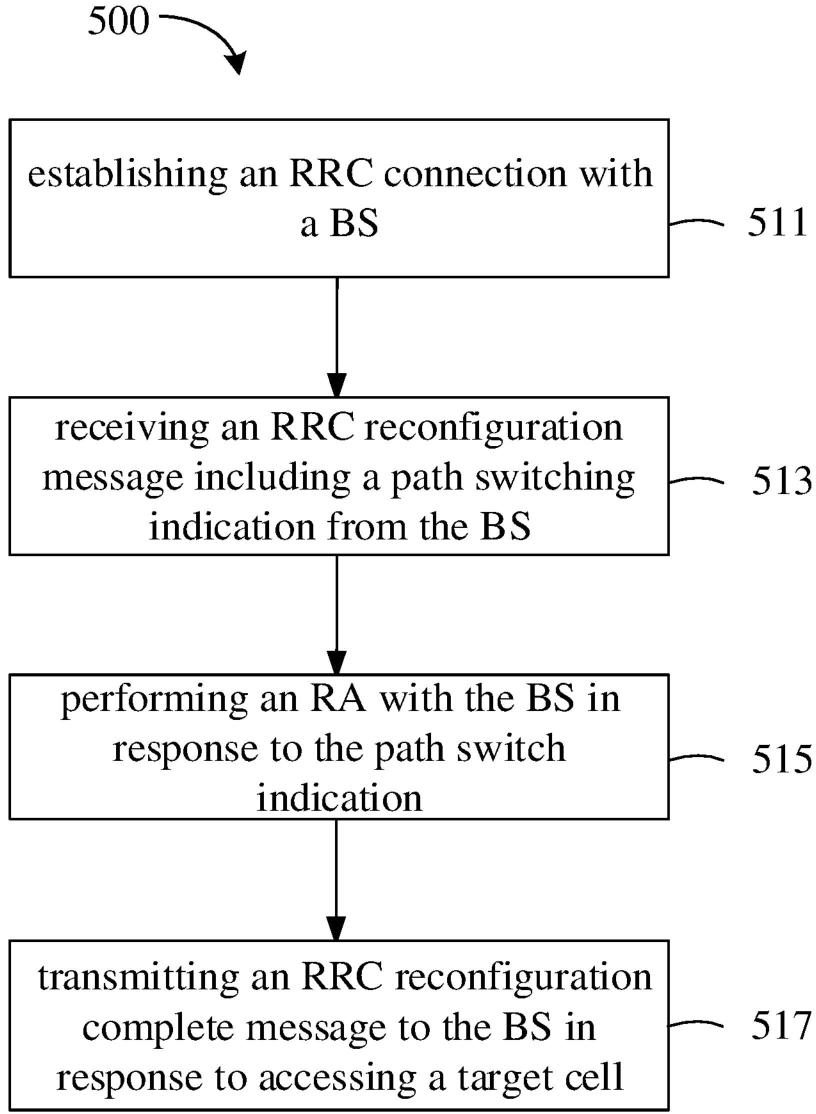
FIG. 5 illustrates an exemplary path switch procedure in accordance with some embodiments of the present disclosure.

FIG. 5 illustrates an exemplary path switch procedure 500 in accordance with some embodiments of the present disclosure. Details described in all of the foregoing embodiments of the present disclosure are applicable for the embodiments shown in FIG. 5. In some examples, the procedure may be performed by a UE, for example, UE 301A in FIG. 3 or UE 401A in FIG. 4.

Referring to FIG. 5, an RRC connection between a UE (hereinafter, "second UE") and a BS has been established. A PC5 RRC connection between the second UE and another UE (hereinafter, "first UE") has been established. In operation 511, the first UE may establish an RRC connection with the BS via the second UE. The first UE may function as a remote UE (e.g., UE 301A in FIG. 3 or UE 401A in FIG. 4) and the second UE may function as a relay UE (e.g., UE 301B in FIG. 3 or UE 401B in FIG. 4).

In operation 513, the first UE may receive an RRC reconfiguration message including a path switching indication from the BS. The path switching indication may indicate a switch to a target cell of the BS using a Uu interface. The path switch indication may be indicated by the RRC reconfiguration message including reconfiguration with sync IE.

In response to receiving the RRC reconfiguration message including the path switching indication, the first UE may perform various operations as described above with respect to FIGS. 3 and 4.

For example, in response to receiving the path switch indication, the first UE may retain at least one of a SDAP configuration, a PDCP configuration, and an RRC configuration at the first UE.

In some examples, in response to receiving the path switch indication, the first UE may perform at least one of transmitting a PC5 link release indication to the second UE, and releasing the PC5 RRC connection between the first UE and the second UE.

In some examples, in response to the reception of the path switch indication, the first UE may perform at least one of continuing to transmit data, signaling, or both terminated at the second UE to the second UE, and continuing to receive data, signaling, or both originated from either the BS or the second UE from the second UE.

In some instances, continuing to receive data, signaling, or both may include receiving an end-mark indication indicating a last DL data associated with the first UE; receiving one of an RRC message, a control PDU on an adaptation layer and an MAC CE which indicates a completion of DL data forwarding; or receiving a PC5 link release indication from the second UE in response to the completion of DL data forwarding. In some examples, in response to the end-mark indication, in response to the completion of DL data forwarding indicated by the RRC message, the control PDU on the adaptation layer or the MAC CE, or in response to the PC5 link release indication, the first UE may release the PC5 RRC connection between the first UE and the second UE.

In operation 515, in response to the path switch indication, the first UE may perform an RA with the BS. In operation 517, in response to accessing the target cell, the first UE may transmit an RRC reconfiguration complete message to the BS.

The RRC reconfiguration complete message may include information as described above with respect to FIGS. 3 and 4. In some examples, the RRC reconfiguration complete message may indicate at least one of: whether the PC5 RRC connection between the first UE and the second UE is released or not; an RLF indication for a PC5 link in response to an RLF on the PC5 RRC connection between the first UE and the second UE is detected; and whether downlink (DL) data forwarding is completed or not.

In some embodiments of the present disclosure, the first UE may receive a PC5 link release indication from the BS. The PC5 link release indication may be included in an RRC reconfiguration message. The first UE may release the PC5 RRC connection between the first UE and the second UE in response to receiving the PC5 link release indication.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
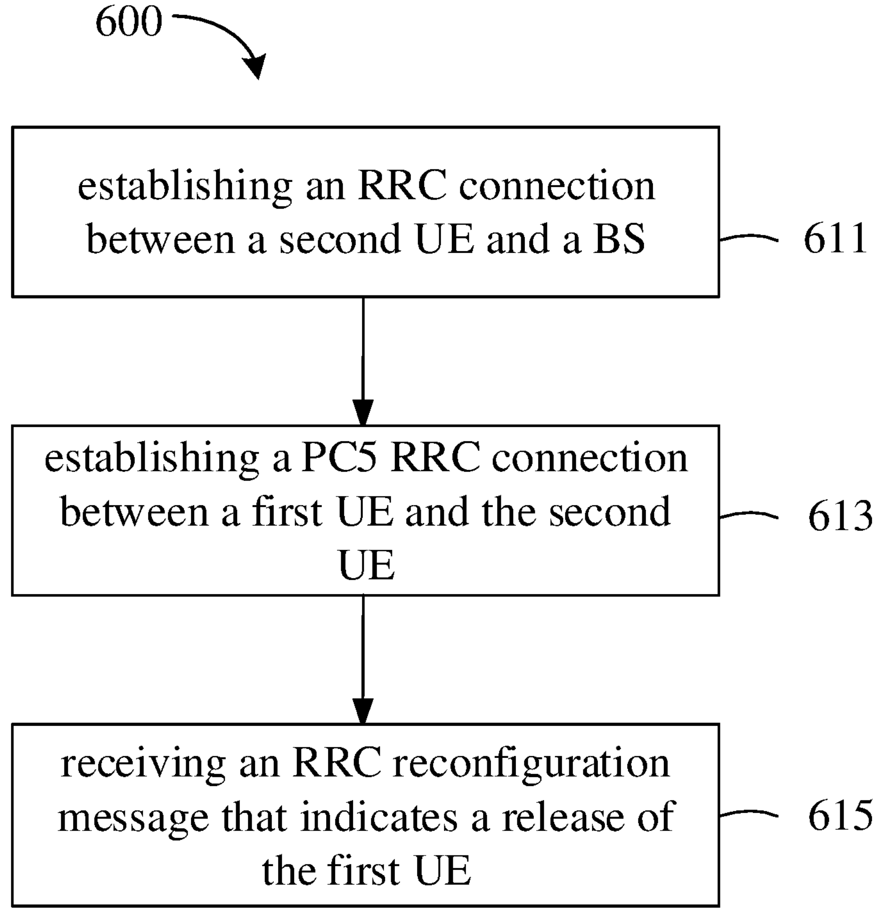
FIG. 6 illustrates an exemplary path switch procedure in accordance with some embodiments of the present disclosure.

FIG. 6 illustrates an exemplary path switch procedure 600 in accordance with some embodiments of the present disclosure. Details described in all of the foregoing embodiments of the present disclosure are applicable for the embodiments shown in FIG. 6. In some examples, the procedure may be performed by a UE, for example, UE 301B in FIG. 3 or UE 401B in FIG. 4.

Referring to FIG. 6, in operation 611, a UE (hereinafter, "second UE") may establish an RRC connection between the second UE and a BS. In operation 613, the second UE may establish a PC5 RRC connection between another UE (hereinafter, a first UE) and the second UE. The first UE may establish an RRC connection with the BS via the second UE. The first UE may function as a remote UE (e.g., UE 301A in FIG. 3 or UE 401A in FIG. 4) and the second UE may function as a relay UE (e.g., UE 301B in FIG. 3 or UE 401B in FIG. 4).

In operation 615, the second UE may receive, from the BS, an RRC reconfiguration message that indicates a release of the first UE. The RRC reconfiguration message may include information as described above with respect to FIGS. 3 and 4.

For example, the RRC reconfiguration message may indicate at least one of: a local UE ID of the first UE; whether UL data from the first UE to the BS buffered at the second UE is transmitted to the BS or not; and whether DL data to the first UE buffered at the second UE is transmitted to the first UE or not.

In response to receiving the RRC reconfiguration message or the path switching indication, the second UE may perform various operations as described above with respect to FIGS. 3 and 4.

For example, after the reception of the RRC reconfiguration message, the second UE may perform at least one of: continuing to transmit UL data, UL signaling, or both from the first UE to the BS buffered at the second UE to the BS; and continuing to transmit DL data, DL signaling, or both originated from either the BS or the second UE to the first UE.

In some instances, continuing to transmit UL data, UL signaling, or both may include: transmitting an end-mark indication indicating a last UL data associated with the first UE; or transmitting one of an RRC message, a control PDU on an adaptation layer and an MAC CE which indicates a completion of UL data forwarding. In some instances, continuing to transmit DL data, DL signaling, or both may include: transmitting an end-mark indication indicating a last DL data associated with the first UE; or transmitting one of an RRC message, a control PDU on an adaptation layer and an MAC CE which indicates a completion of DL data forwarding.

In some embodiments of the present disclosure, in response to the completion of UL data forwarding, the second UE may release the Uu configuration associated with the first UE. In response to the completion of DL data forwarding, the second UE may perform at least one of: transmitting a PC5 link release indication to the first UE; and releasing the PC5 RRC connection between the first UE and the second UE.

In some embodiments of the present disclosure, in response to receiving the RRC reconfiguration message, the second UE may perform at least one of: releasing the PC5 RRC connection between the first UE and the second UE; transmitting a PC5 link release indication to the first UE; and clearing a DL buffer associated with the first UE.

In some embodiments of the present disclosure, the second UE may receive a PC5 link release indication from the first UE; and may release the PC5 RRC connection between the first UE and the second UE in response to receiving the PC5 link release indication.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
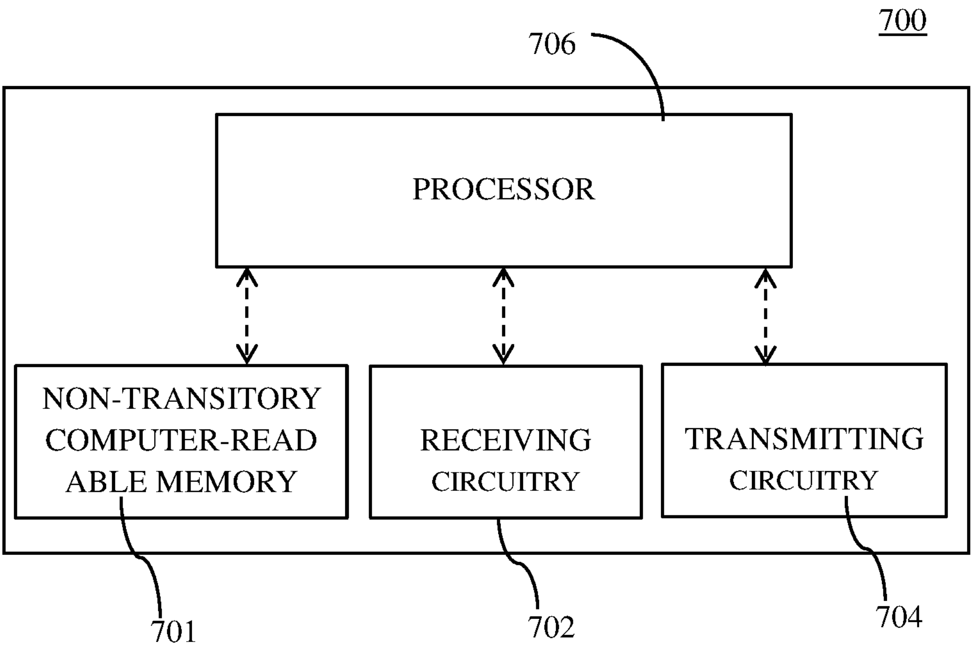
FIG. 7 illustrates a block diagram of an exemplary apparatus in accordance with some embodiments of the present disclosure.

FIG. 7 illustrates a block diagram of an exemplary apparatus 700 according to some embodiments of the present disclosure.

As shown in FIG. 7, the apparatus 700 may include at least one non-transitory computer-readable medium 701, at least one receiving circuitry 702, at least one transmitting circuitry 704, and at least one processor 706 coupled to the non-transitory computer-readable medium 701, the receiving circuitry 702 and the transmitting circuitry 704. The apparatus 700 may be a base station side apparatus (e.g., a BS) or a communication device (e.g., a UE).

Although in this figure, elements such as the at least one processor 706, transmitting circuitry 704, and receiving circuitry 702 are described in the singular, the plural is contemplated unless a limitation to the singular is explicitly stated. In some embodiments of the present application, the receiving circuitry 702 and the transmitting circuitry 704 are combined into a single device, such as a transceiver. In certain embodiments of the present application, the apparatus 700 may further include an input device, a memory, and/or other components.

In some embodiments of the present disclosure, the non-transitory computer-readable medium 701 may have stored thereon computer-executable instructions to cause a processor to implement the method with respect to the UEs as described above. For example, the computer-executable instructions, when executed, cause the processor 706 interacting with receiving circuitry 702 and transmitting circuitry 704, so as to perform the operations with respect to the UEs (either a remote UE or a relay UE) described in FIGS. 1-6.

In some embodiments of the present disclosure, the non-transitory computer-readable medium 701 may have stored thereon computer-executable instructions to cause a processor to implement the method with respect to the BSs as described above. For example, the computer-executable instructions, when executed, cause the processor 706 interacting with receiving circuitry 702 and transmitting circuitry 704, so as to perform the operations with respect to the BSs described in FIGS. 1-4.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed is:

1. An apparatus for wireless communication, comprising:
at least one memory; and
at least one processor coupled with the at least one memory and configured to cause the apparatus to:
establish, at a first user equipment (UE), a radio resource control (RRC) connection with a base station (BS) via a second UE, wherein a PC5 RRC connection between the first UE and the second UE has been established and an RRC connection between the second UE and the BS has been established;
receive an RRC reconfiguration message including a path switch indication from the BS, wherein the path switch indication indicates a switch to a target cell of the BS using a Uu interface and the path switch indication is indicated by a reconfiguration with sync information element (IE);
transmit, in response to receiving the path switch indication, a PC5 link release indication to the second UE;
release, in response to receiving the path switch indication, the PC5 RRC connection between the first UE and the second UE;
perform, in response to the path switch indication, a random access (RA) with the BS; and
transmit, in response to accessing the target cell, an RRC reconfiguration complete message to the BS.

2. The apparatus of claim 1, wherein in response to receiving the path switch indication, the at least one processor is configured to cause the apparatus to at least one of:
retain at least one of a service data adaptation protocol (SDAP) configuration, a packet data convergence protocol (PDCP) configuration, and an RRC configuration at the first UE;
continue to transmit data, signaling, or both terminated at the second UE to the second UE; or
continue to receive data, signaling, or both originated from either the BS or the second UE from the second UE.

3. The apparatus of claim 2, wherein to continue to receive data, signaling, or both comprises one or more of to:
receive an end-mark indication indicating a last downlink (DL) data associated with the first UE;
receive one of an RRC message, a control protocol data unit (PDU) on an adaptation layer, or a medium access control (MAC) control element (CE) which indicates a completion of DL data forwarding; or
receive a PC5 link release indication from the second UE in response to the completion of DL data forwarding.

4. The apparatus of claim 3, wherein the at least one processor is configured to cause the apparatus to:
release the PC5 RRC connection between the first UE and the second UE in response to at least one of:
the end-mark indication;
in response to one or more of the completion of DL data forwarding indicated by the RRC message, the control PDU on the adaptation layer, or the MAC CE; or
in response to the PC5 link release indication.

5. The apparatus of claim 1, wherein the RRC reconfiguration complete message indicates at least one of:
whether the PC5 RRC connection between the first UE and the second UE is released;
a radio link failure (RLF) indication for a PC5 link in response to an RLF on the PC5 RRC connection between the first UE and the second UE is detected; or
whether downlink (DL) data forwarding is completed.

6. The apparatus of claim 1, wherein the at least one processor is configured to cause the apparatus to:
receive a PC5 link release indication from the BS; and
release the PC5 RRC connection between the first UE and the second UE in response to receiving the PC5 link release indication.

7. The apparatus of claim 1, wherein the RRC reconfiguration message indicates whether uplink (UL) data from the first UE to the BS buffered at the second UE is transmitted to the BS or not, and the processor is configured to cause the apparatus to, after the reception of the RRC reconfiguration message, continue to transmit UL data from the first UE to the BS buffered at the second UE to the BS.

8. The apparatus of claim 1, wherein the RRC reconfiguration message indicates whether downlink (DL) data to the first UE buffered at the second UE is transmitted to the first UE or not.

9. An apparatus for wireless communication, comprising:
at least one memory; and
at least one processor coupled with the at least one memory and configured to cause the apparatus to:
establish a radio resource control (RRC) connection between a second user equipment (UE) and a base station (BS);
establish a PC5 RRC connection between a first UE and the second UE;
receive, at the second UE from the BS, an RRC reconfiguration message that indicates a release of the first UE;
in response to receiving the RRC configuration message, release the PC5 RRC connection between the first UE and the second UE, the RRC configuration message indicates a list of the first UE;
in response to receiving the RRC configuration message, transmit a PC5 link release indication to the first UE; and
receive a PC5 link release indication from the first UE.

10. The apparatus of claim 9, wherein the RRC reconfiguration message indicates at least one of:
whether uplink (UL) data from the first UE to the BS buffered at the second UE is transmitted to the BS or not; or
whether downlink (DL) data to the first UE buffered at the second UE is transmitted to the first UE or not; and
the processor is configured to cause the apparatus to, after the reception of the RRC reconfiguration message, at least one of:
continue to transmit UL data from the first UE to the BS buffered at the second UE to the BS; or
continue to transmit DL data, DL signaling, or both originated from either the BS or the second UE to the first UE.

11. The apparatus of claim 10, wherein to continue to transmit UL data, the at least one processor is configured to cause the apparatus to at least one of:
transmit an end-mark indication indicating a last UL data associated with the first UE; or
transmit at least one of an RRC message, a control protocol data unit (PDU) on an adaptation layer, or a medium access control (MAC) control element (CE) which indicates a completion of UL data forwarding.

12. The apparatus of claim 10, wherein to continue to transmit DL data, DL signaling, or both, the at least one processor is configured to cause the apparatus to at least one of:

transmit an end-mark indication indicating a last DL data associated with the first UE; or transmit at least one of an RRC message, a control protocol data unit (PDU) on an adaptation layer, or a medium access control (MAC) control element (CE) which indicates a completion of DL data forwarding.

13. The apparatus of claim 10, wherein the at least one processor is configured to cause the apparatus to at least one of:

release, in response to a completion of UL data forwarding, Uu configuration associated with the first UE; or in response to a completion of DL data forwarding, at least one of:

transmit a PC5 link release indication to the first UE; or release the PC5 RRC connection between the first UE and the second UE.

14. The apparatus of claim 9, wherein the at least one processor is configured to cause the apparatus to, in response to receiving the RRC reconfiguration message, clear a downlink (DL) buffer associated with the first UE.

15. The apparatus of claim 9, wherein the at least one processor is configured to cause the apparatus to release the PC5 RRC connection between the first UE and the second UE in response to receiving the PC5 link release indication.

16. The apparatus of claim 9, wherein the at least one processor is configured to cause the apparatus to, in response to receiving the RRC reconfiguration message, cause the second UE to release one or more of the first UE, a configuration associated with the first UE, or a bearer mapping associated with the first UE.

17. A method, comprising:

establishing, at a first user equipment (UE), a radio resource control (RRC) connection with a base station (BS) via a second UE, a PC5 RRC connection between the first UE and the second UE being established and an RRC connection between the second UE and the BS being established;

receiving an RRC reconfiguration message including a path switching indication from the BS, the path switching indication indicating a switch to a target cell of the BS using a Uu interface, wherein the path switch indication is indicated by a reconfiguration with sync information element (IE);

transmitting, in response to receiving the path switch indication, a PC5 link release indication to the second UE;

releasing, in response to receiving the path switch indication, the PC5 RRC connection between the first UE and the second UE;

performing, in response to the path switch indication, a random access (RA) with the BS; and transmitting, in response to accessing the target cell, an RRC reconfiguration complete message to the BS.

18. The method of claim 17, further comprising, in response to receiving the path switch indication, at least one of:

retaining at least one of a service data adaptation protocol (SDAP) configuration, a packet data convergence protocol (PDCP) configuration, or an RRC configuration at the first UE;

continuing to transmit data, signaling, or both terminated at the second UE to the second UE; or continuing to receive data, signaling, or both originated from either the BS or the second UE from the second UE.

19. The method of claim 18, wherein continuing to receive data, signaling, or both comprises at least one of:

receiving an end-mark indication indicating a last downlink (DL) data associated with the first UE;

receiving one of an RRC message, a control protocol data unit (PDU) on an adaptation layer and a medium access control (MAC) control element (CE) which indicates a completion of DL data forwarding; or receiving a PC5 link release indication from the second UE in response to the completion of DL data forwarding.

20. The method of claim 19, further comprising:

releasing the PC5 RRC connection between the first UE and the second UE in response to at least one of:

the end-mark indication;

the completion of DL data forwarding indicated by one or more of the RRC message, the control PDU on the adaptation layer or the MAC CE; or the PC5 link release indication.

* * * * *